(12) United States Patent
Johnson et al.

(10) Patent No.: US 6,283,483 B1
(45) Date of Patent: Sep. 4, 2001

(54) ELECTRONICALLLY CONTROLLED ACKERMAN STEERING

(75) Inventors: Stephen D. Johnson; Edward P. Legler, both of Denton, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/363,468

(22) Filed: Jul. 29, 1999

(51) Int. Cl.$^7$ .................................................. B62D 17/00
(52) U.S. Cl. .............................. 280/86.758; 280/5.522; 280/93.51; 74/586
(58) Field of Search ................... 280/5.522, 5.52, 280/86.757, 86.758, 93.5, 93.51, 124.16; 74/586; 180/410, 421, 437; 92/130 R; 60/406

(56) References Cited

U.S. PATENT DOCUMENTS

| | | | |
|---|---|---|---|
| 2,578,727 | * 12/1951 | Mork | 92/130 R |
| 3,347,044 | * 10/1967 | Medley | 92/130 R |
| 3,498,630 | * 3/1970 | Crawford | 280/86.758 |
| 3,596,730 | * 8/1971 | Cecce | 180/414 |
| 3,765,697 | * 10/1973 | Bobard | 280/93.51 |
| 3,815,471 | * 6/1974 | Kobelt | 92/130 R |
| 3,955,479 | * 5/1976 | McLuckie | 92/130 R |
| 4,885,981 | * 12/1989 | Roettger et al. | 92/130 R |
| 5,143,400 | 9/1992 | Miller et al. | 280/661 |
| 5,257,458 | * 11/1993 | Koerner | 33/203.12 |
| 5,314,036 | * 5/1994 | Kato et al. | 180/427 |
| 5,682,980 | * 11/1997 | Reybrouck | 280/124.16 |
| 5,700,025 | * 12/1997 | Lee | 280/86.758 |
| 6,131,937 | * 10/2000 | Coenen | 92/130 R |

OTHER PUBLICATIONS

T. I. Monroe, "Discussion of Steering Problems on Modern Heavy Trucks", Society of Automotive Engineers, Inc. *SAE Technical Paper 368A*, 1961, (6 pages).

William H. Baier, "Vehicle Steering Fundamentals", SAE Paper No. 610025, 1961 (pp. 256–268).

R.B. Kazmier, "Use of Computers in Steering Geometry Analysis", *SAE Paper SP–240*, Dec., 1962 (pp. 1–7).

Gerald R. Miller, "The Effect of Ackerman Steering Correction Upon Front Tire Wear of Medium Duty Trucks", *SAE Technical Paper Series*, 1986 (7 pages).

Gerald Miller, Robert Reed, and Fred Wheeler, "Optimum Ackerman for Improved Steering Axle Tire Wear on Trucks", SAE Paper No. 912693, Undated (pp. 107–128).

Charles E. Bird, "Ackermann Computer Programs for Heavy Truck Front Axles", *SAE Paper No. 942302*, Undated (pp. 35–38).

\* cited by examiner

*Primary Examiner*—Lanna Mai
*Assistant Examiner*—Ruth Ilan
(74) *Attorney, Agent, or Firm*—Sidley Austin Brown & Wood (57) ABSTRACT

A system is provided for use on a vehicle (10) which allows the relative angle of turn between a first steerable wheel (20) and a second steerable wheel (22) to be established by use of a tie rod assembly (32) which is variable in length. The tie rod assembly (32) includes a hydraulic cylinder assembly to vary the length by introducing or removing pressurized hydraulic fluid. A spring (120) is provided to establish a predetermined length to the tie rod assembly should the hydraulic system fail. The length of the tie rod assembly is controlled by an electronic control (166) which is provided with data from angle sensors (160,162) at each of these steerable wheels. The electronic control can be provided with an electronic table of relative angles for the wheel members and can adjust the length of the tie rod appropriately. The device allows for establishing the desired relationship between the wheel members at any turn angle. Further, the system can provide continuously accurate Ackerman steering angles between the wheels for all conditions of vehicle operation, including vehicle wheel base, vehicle track, axle weight and vehicle speed.

14 Claims, 4 Drawing Sheets

ELECTRONICALLLY CONTROLLED ACKERMAN STEERING

TECHNICAL FIELD OF THE INVENTION

This invention relates generally to the steering mechanisms of wheeled vehicles. In one aspect, it relates to a system for directly sensing the steer angle of each wheel in a pair of steerable wheels and actively adjusting the length of a portion of the steering linkage to obtain a predetermined toe angle between the steerable wheels for each turning angle of the vehicle.

BACKGROUND OF THE INVENTION

The Ackerman steering principle holds that correct (i.e., perfect or ideal) steering requires the projected axes of a vehicle's steerable front wheels to intersect each other on a projection of the rear axle centerline during any turn so that all wheels will have pure rolling motion about the common point of intersection. A general appreciation of the Ackerman steering principle within the automotive industry has led to the near-universal adoption of steering mechanisms having geometries designed to approximate correct Ackerman steering. A fundamental requirement of Ackerman steering is that, during a turn, the inside steerable wheel must have a greater steer angle, relative to the vehicle's longitudinal centerline, than the outside steerable wheel; the difference in steer angles between the steerable wheels being termed the toe angle. The toe angle necessary for correct Ackerman steering is a function of the vehicle's turning angle (i.e., the angle between the vehicle's centerline and its direction of travel), its track width and wheelbase. Therefore, the typical vehicle steering system has components, including steering arms, tie rods, idler arms, adjuster sleeves, ball joints, center links, steering knuckles and king pins (collectively referred to in the industry and herein as steering linkage), designed such that the toe angle between the steerable wheels varies to approximate correct Ackerman geometry as the steerable wheels are moved.

In practice, however, a typical steering linkage actually produces perfect Ackerman steering for only one turning angle of the vehicle. For all other turning angles, the toe angle produced by the steering linkage produces some Ackerman error (i.e., a mis-match between the point of intersection for the axes of steerable wheels and the rear axle line), also known as steering error. This steering error creates slippage problems because the steerable wheels and other wheels of the vehicle are not moving around a common radius point. This slippage can result in increased wear on the tires and reduced traction for the vehicle.

Many approaches for reducing the Ackerman steering error problem have been suggested. The majority of such approaches take the form of methodologies for selecting the geometric parameters for a conventional steering linkage, i.e., a steering linkage in which each constituent component has a fixed configuration. For example, a research paper entitled *"Use of Computers in Steering Geometry Analysis"* by R. B. Kazmier, Section #6 of SAE Paper SP-240 presented December 1962 describes analytical, semi-graphic, and computer-based methods for the calculation of geometric parameters for conventional steering linkages to reduce the Ackerman steering error problem. While such approaches are useful in reducing the Ackerman error in conventional steering linkages, it is nonetheless generally recognized that conventional steering linkages can totally eliminate the Ackerman steering error at only one turning angle. Therefore, some degree of Ackerman steering error remains for the majority of turning angles.

When conventional steering linkages are used, any change in the steering-related parameters (e.g., wheelbase, wheel track, axle weight rating) between different vehicle models will necessitate the calculation of new steering geometry in order to minimize the Ackerman error. Even a change in load on the vehicle will change the steering geometry. Further, steering linkage components having different configurations must be kept in inventory to accommodate each different geometry. Thus, when a manufacturer offers a large number of models, it can become very expensive to provide steering linkage which is optimally tailored to minimize Ackerman error for each model.

With conventional steering linkages, the configuration and physical location of the linkage components with respect to the other vehicle components, such as the chassis, is largely dictated by the required geometry. In some cases, the linkage geometry needed to approximate correct Ackerman steering interferes with the positioning of other equipment on the vehicle. For example, on some long wheelbase trucks, the configuration of the tie rod arms needed to approximate correct Ackerman steering would cause the tie rod arms to interfere with certain popular wheel rims. As a result, correct Ackerman geometry is normally sacrificed to allow the customer their choice of wheel rims.

To overcome the limitations of conventional steering linkages, another approach to addressing Ackerman steering error involves the use of active steering angle adjustment systems in which one or more steering linkage components have a configuration which changes automatically to change the steering geometry as the vehicle is being operated. One such approach is described in U.S. Pat. No. 5,143,400 which discloses a system that uses a computer to actively adjust the toe angle between a steerable slave wheel and steerable control wheel based upon measurements of the actual steer angle of the slave wheel and the calculated steer angle of the control wheel. The system disclosed in U.S. Pat. No. 5,143, 400 uses a mechanical actuator to continuously adjust the length of the steering assembly tie rod, thereby adjusting the toe angle between the steerable wheels.

The use of active steering angle adjustment systems can overcome some of the drawbacks found in fixed length steering linkage systems. However, several limitations remain in the active steering angle adjustment systems disclosed in the prior art. Most importantly, a steering angle adjustment system which measures the steer angle from only one of the steerable wheels is subject to error because all of the toe angle corrections generated by the system must be based on a calculated steer angle for the second steerable wheel. The calculations are typically based on the theoretical (i.e., "as designed") geometry of the steering linkage rather than the actual (i.e., "as built") geometry which exists after the linkage is installed in a vehicle. Differences between the theoretical and actual geometries introduce errors into the steering angle calculations. In addition, such calculations can also be rendered inaccurate by a variety of other factors, for example if the steering linkage becomes worn, bent or is modified, or if the load on the vehicle changes. At a minimum, the new parameters of the vehicle must be re-entered into the steering system computer after any such change to maintain steering accuracy. A need therefore exists for a steering angle adjustment system in which steering accuracy can be determined independent from any knowledge of the steering linkage geometry.

Another limitation encountered in prior art active steering adjustment systems is that these systems are not designed to fail in a safe mode. In the event of a failure in the active steering angle adjustment system, it is critical that the toe angle between the wheels not be allowed to drift, change uncontrollably, or become locked in a position that could adversely affect control of the vehicle. A need therefore exists for a steering angle adjustment system which would return the toe angles between the steerable wheels to a predetermined geometry in the event of a failure in the system.

SUMMARY OF THE INVENTION

In accordance with one aspect of the present invention, a steering system for a vehicle is provided. The system is used on a vehicle with first and second steerable wheel members mounted to the vehicle for pivotal motion about a first axis and second axis, respectively. The system includes a tie rod assembly mounted between the first and second steerable wheel members to link the first and second steerable wheel members together for simultaneous pivotal motion about their respective axes. The tie rod assembly has a length which determines the angular position of the second steerable wheel member about the second axis dependent upon the angular position of the first steerable wheel member about the first axis. The tie rod assembly includes a mechanism for adjusting its length. A first angle sensor is mounted to the vehicle to sense the steer angle of the first steerable wheel member relative to a reference line and a second angle sensor is mounted on the vehicle to sense the steer angle of the second steerable wheel member relative to a reference line. A control adjusts the length of the tie rod assembly dependent upon the steer angles measured by the first angle sensor and the second angle sensor. The control can maintain a desired relationship between the steer angles of the first and second steerable wheels for all vehicle conditions by varying the length of the tie rod assembly. The control can maintain a desired steer angle relationship between the first and second steerable wheels to provide correct Ackerman steering for all vehicle conditions. The control can also provide for maintenance of the proper toe-in angle.

In accordance with another aspect of the present invention, a tie rod is provided which has a first end and a second end with a predetermined length between the first and second ends. The tie rod includes a first section and a second section, the first end being on the first section and the second end being on the second section. The first and second sections are interconnected for limited variable movement relative to each other between a first, elongated length and a second, shortened length. A spring is disposed between the first and second sections to urge the first and second sections to one of said predetermined lengths. The first and second sections form a hydraulic cylinder defining a chamber, permitting pressurized hydraulic fluid to be entered into the chamber to counteract the force of the spring and urge the first and second sections toward the other predetermined length.

BRIEF DESCRIPTION OF THE DRAWINGS

A more complete understanding of the invention and its advantages will be apparent from the following detailed description when taken in conjunction with the accompanying drawings, in which.

DETAILED DESCRIPTION OF THE INVENTION

With reference to the figures, wherein like and corresponding parts throughout the several views are identified by the same reference numerals, there is disclosed a first embodiment of the present invention for application to a vehicle 10, such as a truck or automobile, which has steerable wheels 20 and 22 at the front of the vehicle and nonsteerable wheels 24 at the rear of the vehicle. As will be described in greater detail, the invention provides for constant readjustment of the steer angle of one steerable wheel relative to the other steerable wheel to provide correct Ackerman steering at all times.

Figure 1:
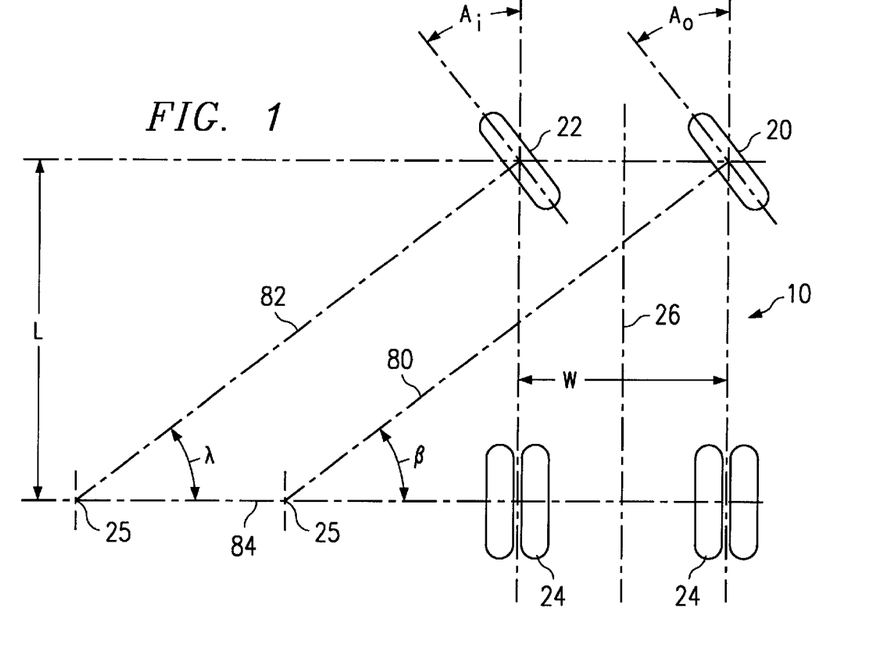
FIG. 1 is a diagram illustrating vehicle steering geometry in accordance with the Ackerman steering principle with Ackerman steering error.

With reference to FIG. 1, the vehicle 10 has a wheelbase, L, measured longitudinally between the front and rear wheel axes, and a track width, W, measured laterally between the pivot axes of the steerable front wheels 20 and 22. When the vehicle 10 makes a turn, the steerable front wheel on the outside of the turn, referred to as the outer wheel, will define an outer steer angle, $A_o$, relative to the elongate axis 26 of the vehicle while the other steerable wheel on the inside of the turn, referred to as the inner wheel, will define an inner steer angle, $A_i$ relative to the axis 26. For example, in FIG. 1, the vehicle 10 is seen engaged in a left hand turn. In this case the right steerable wheel 20 is the outer wheel which defines the outer steer angle, $A_o$, relative to the elongate axis 26 of the vehicle, while the left steerable wheel 22 is the inner wheel which defines the inner steer angle, $A_i$, relative to the axis 26. It will be readily apparent that the wheels defining angles $A_i$ and $A_o$ would be reversed for a right-hand turn.

Referring still to FIG. 1, projecting the rotational axes 80 and 82 of the steerable wheels 20 and 22, respectively, to intersect the axis of rotation 84 of the rear wheels, it can be seen that the axes 80 and 82 do not intersect at a single point as required for correct Ackerman steering. Instead, the axes 80 and 82 intersect the axis 84 at two spaced-apart points 25. Thus, the angular relationship between the steer angles $A_i$ and $A_o$, sometimes specified in terms of a toe angle (where the toe angle equals the angular difference between $A_i$ and $A_o$), for the vehicle shown in FIG. 1 does not provide correct Ackerman steering, but instead produces undesirable Ackerman error which can lead to the disadvantages previously discussed.

Figure 2:
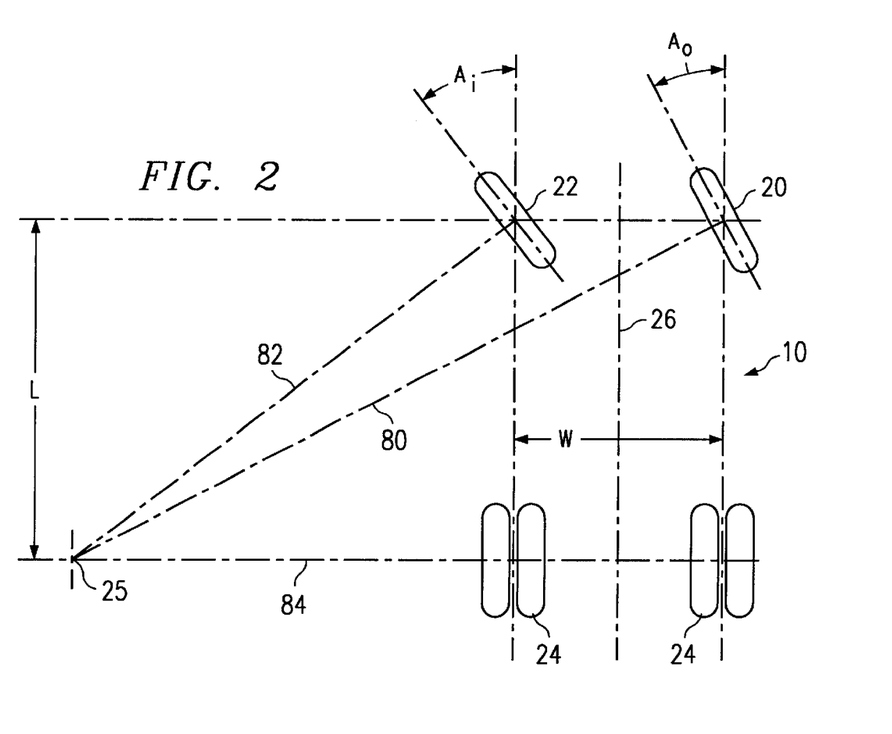
FIG. 2 is a diagram, similar to FIG. 1, but illustrating vehicle steering geometry with correct Ackerman steering.

With reference to FIG. 2, the advantages of the present invention in maintaining a desired steer angle relationship between the steerable wheels 20 and 22 to provide correct Ackerman steering will be illustrated. In the present invention, when the outer wheel 20 is turned to steer angle $A_o$, the inner wheel 22 is turned to steer angle $A_i$ such that the projected axes of rotation 80 and 82 of the wheels 20 and 22 will intersect at a single point 25 on the rear wheel axis 84, thus achieving correct Ackerman steering. The specific steer angles $A_i$ and $A_o$ necessary to provide correct Ackerman steering vary continuously as the turn angle of the vehicle changes. However, for a given steer angle $A_i$ or $A_o$, the remaining steer angle (and hence also the corresponding toe angle) necessary for correct Ackerman steering can easily be determined using the following relationship:

$$\cot(A_o) - \cot(A_i) = (W/L)$$

where the variables $A_i$, $A_o$, W and L are as previously defined. It should be noted, if multiple non-steerable axles are used on the vehicle, for example a typical semi-trailer truck tractor having dual rear axles, the axis 84 will generally be defined halfway between the rotational axes of the two rear axle assemblies.

Figure 3:
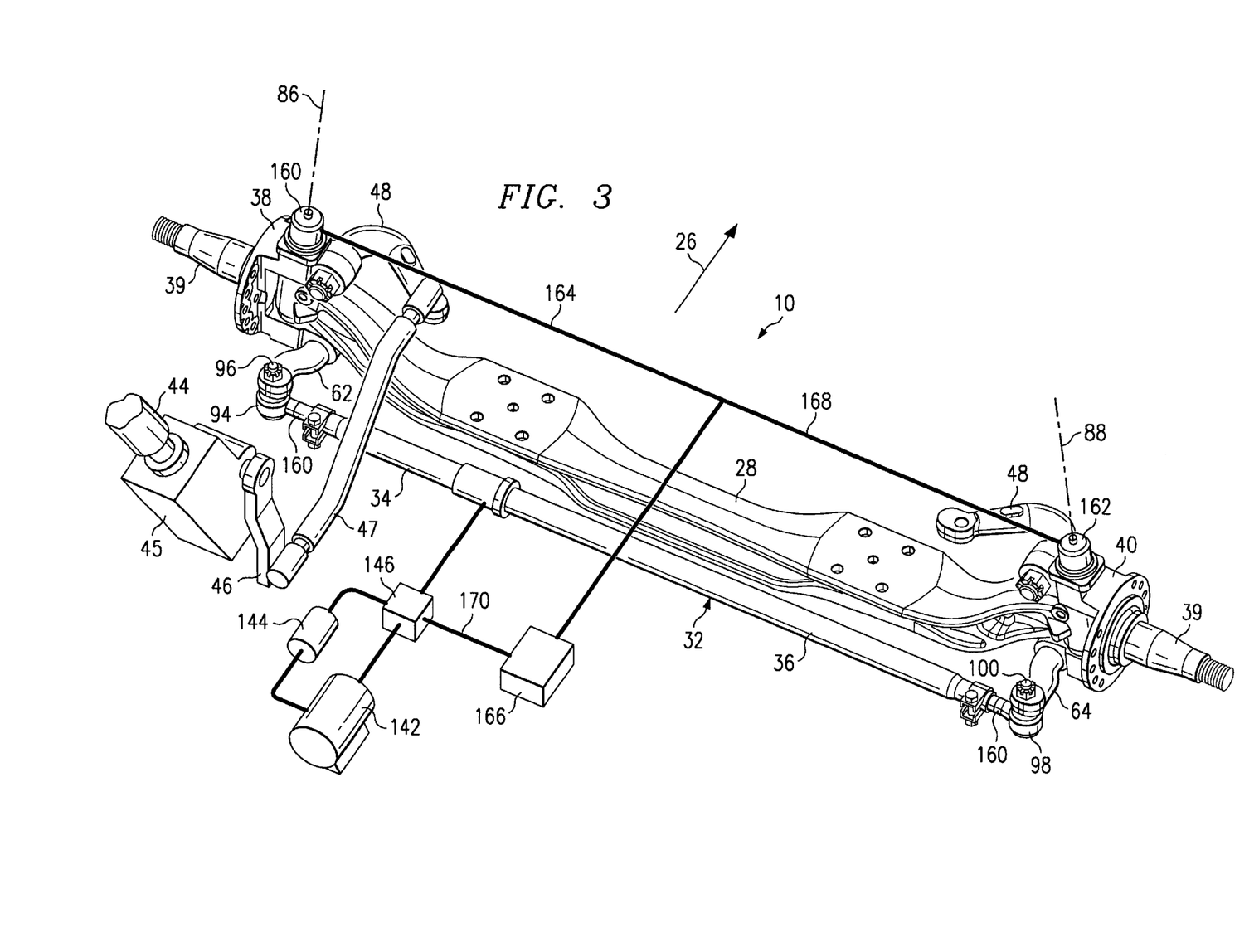
FIG. 3 is a perspective view of a steering system according to one embodiment of the current invention.

With reference to FIGS. 3–6, the first embodiment of the present invention will be described in greater detail. While illustrated for use on a conventional truck chassis, it will be apparent that the invention can be utilized with any steerable moving vehicle, such as a bus or passenger automobile. The vehicle 10 includes one or more front steering support members 28 connected to the vehicle through a conventional suspension (not shown). The support member 28 shown in FIG. 3 is a solid axle, however other steering support members such as split axles and wishbones can be used. At the outer ends of the steering support member 28, which generally extends perpendicular the axis 26 of the vehicle, are mounted the left steering knuckle 38 and the right steering knuckle 40. The steering knuckles are mounted at the ends of the support member 28 through king pins which allow pivotal motion of the left steering knuckle 38 about a generally vertical axis 86 and of the right steering knuckle 40 about a generally vertical axis 88. Each knuckle includes a spindle 39 which mounts a wheel of the vehicle. A tie rod arm 62 extends from the left steering knuckle 38 while a tie rod arm 64 extends from the right steering knuckle 40. Tie rod arms 62 and 64 are connected by a tie rod assembly 32. As will be described in greater detail hereinafter, the length of the tie rod assembly 32 is adjusted dependent upon the steer angle of one of the wheels to control the steer angle of the other wheel.

The driver of the vehicle 10 provides driver input motion to the steering system of the current invention through a steering mechanism which moves one of the steering knuckles 38 and 40 in response to rotation of the steering wheel (not shown). Any steering mechanism known in the art can be utilized to provide driver input motion without departing from the scope of the current invention. For example, in FIG. 3, the steering mechanism includes a steering column 44, steering gear 45, pitman arm 46 and drag link 47 for moving a steering arm 48 (which extends from the left steering knuckle 38) in response to driver input motions on the steering wheel. Thus, the angular position of the left steering knuckle 38 about the axis 86 is directly determined by the position of the steering wheel and is set by the operator of the vehicle to initiate the desired turn to be made. As the left steering knuckle 38 is pivoted, the right steering knuckle 40 will simultaneously pivot to an angular position determined by the length of the tie rod assembly 32.

Figure 4:
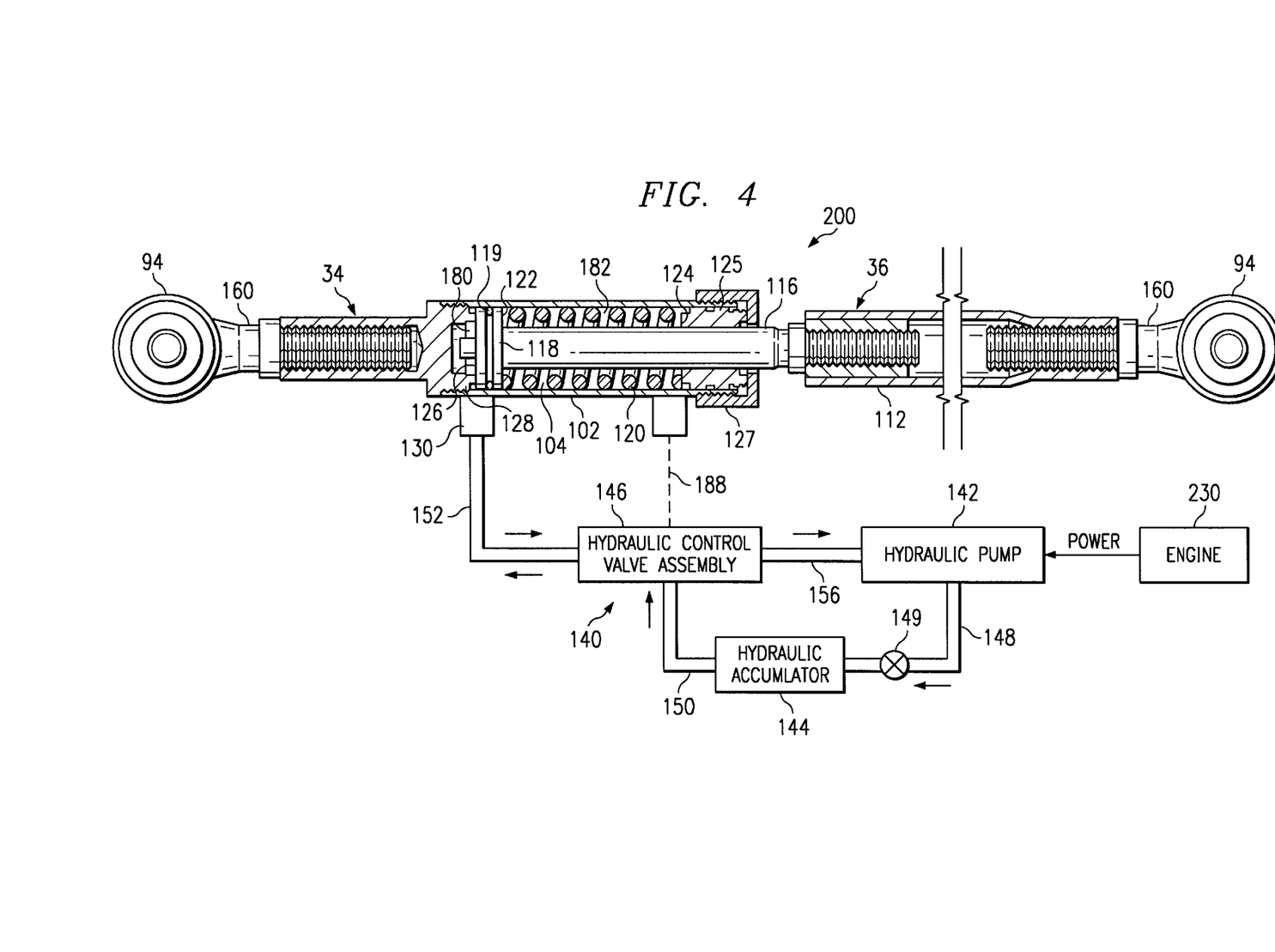
FIG. 4 is a cross-sectional view of a portion of the tie-rod mechanism of the steering system of FIG. 3.

The tie rod assembly 32 can be seen to be formed of a first tie rod portion 34 and a second tie rod portion 36. The outer end 94 of a conventional tie rod end 160 of the first tie rod portion 34 is mounted to the tie rod arm 62 through a universal motion coupling 96 as is well known. The outer end 98 of a conventional tie rod end 160 of the second tie rod portion 36 is similarly connected to the tie rod arm 64 through a universal motion coupling 100. With reference to FIG. 4, the inner end of the first tie rod portion 34 forms the cylinder 102 of a hydraulic linear actuator 200. A threaded rod 116 forming another part of the hydraulic linear actuator 200 is secured to the inner end 112 of the second tie rod portion 36. Rod 116 extends into cavity 104 of cylinder 102 and forms a piston 118 at the end thereof. The piston 118 is sealably engaged with the inner wall of cavity 104 by conventional seals 119, such as O-rings, lip seals, flip seals and the like. The piston 118 separates cavity 104 into a first chamber 180 and a second chamber 182 isolated from each other. A spring 120 is positioned in the second chamber 182 of first cavity 104 and is compressed between the inner surface 122 of the piston 118 and the outer end wall 124 of a rod seal 125 held in the first cavity 104 by a threaded spring retaining cap 127. Cap 127 is threadably received on the end of the cylinder 102. Independently of external forces, the force of the spring 120 is sufficient to urge the end 126 of the piston tightly against the inner end wall 128 of cavity 104 to minimize the length of the tie rod 32, as seen in FIG. 4. The rod seal 125 forms a seal between the inner wall of cavity 104 and the outer surface of rod 116.

The first tie rod portion 34 at cylinder 102 has a port 130 formed therethrough which opens into the first chamber 180 of cavity 104 between the surfaces 126 and 128. A small volume of first chamber 180 remains, even when end 126 is urged against end wall 128 by spring 120, permitting fluid to enter the first chamber 180 from port 130 at all times. Pressurized hydraulic fluid can be forced into this chamber to drive the piston 118 away from the end wall 128 and toward the end wall 124, compressing the spring, to lengthen the tie rod assembly 32.

The hydraulic fluid can be supplied to first chamber 180 by a hydraulic system 140 including a hydraulic pump 142, a hydraulic accumulator 144 and a hydraulic control valve assembly 146. The output of the pump 142 is supplied through fluid line 148 to the hydraulic accumulator 144. The fluid passes through a one way check valve 149 in fluid line 148 that permits fluid flow only from pump 142 to accumulator 144. The output of the hydraulic accumulator is provided through fluid line 150 to the hydraulic control valve assembly 146, which can be a three-position valve. In one position of valve assembly 146, the hydraulic fluid is provided through a fluid line 152 which is connected to port 130 for entry of hydraulic fluid into the chamber 180. In a second position, the hydraulic control valve permits the fluid to flow from chamber 180 through a fluid line 156 and returning to the sump of the hydraulic pump. In a third position, fluid will neither enter nor leave chamber 180. The hydraulic pump 142 is powered either mechanically, electrically, or pneumatically by the engine 230 of the vehicle. A control circuit in hydraulic pump 142 causes it to operate only when necessary to maintain the pressure in accumulator 144 within a predetermined range.

Figure 5:
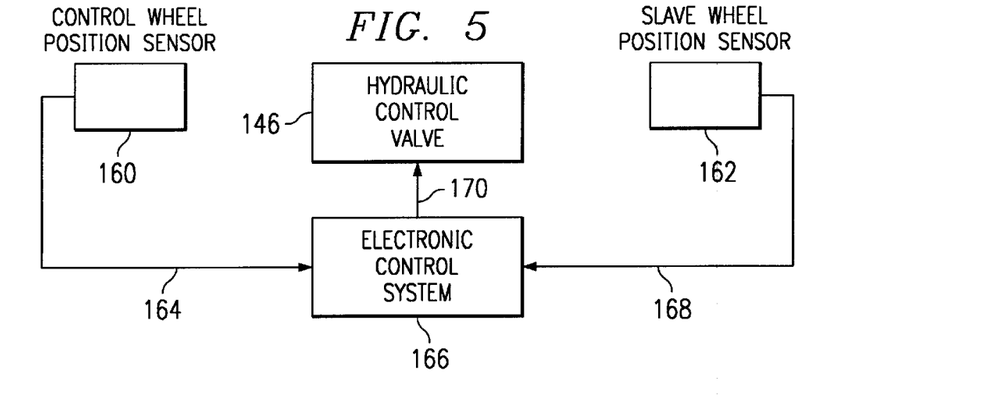
FIG. 5 is a schematic diagram of the control system for the steering system of FIG.3.

With reference again to FIG. 3, a left wheel angle sensor 160 can be seen to be mounted on the vehicle to measure the steer angle of the left steering knuckle 38 relative to a predetermined direction, typically the axis 26 of the vehicle. A similar right wheel angle sensor 162 is mounted on the vehicle to sense the steer angle of the right steering knuckle 40 relative to the same reference direction, again usually the axis 26 of the vehicle. With reference to FIG. 5, the steer angle measurement from the left wheel angle sensor 160 is transmitted along signal line 164 to a central electronic control 166 while the steer angle sensed by the right wheel angle sensor 162 is transmitted along signal line 168 to the electronic control 166. A signal is sent through line 170 from the electronic control 166 to the hydraulic control valve assembly 146 to operate the valve within assembly 146. Angle sensors 160 and 162 can be potentiometers, optical encoders, or other suitable devices.

In operation, the vehicle will be steered in a particular direction by the operator by rotating the steering wheel and pivoting the left steering knuckle 38 to a particular steer angle $A_L$ relative the reference direction. The steer angle is measured by angle sensor 160 and the angle measured is input into electronic control 166 through signal line 164. Electronic control 166 will have a processor and a memory device, as well as a stored operating program. The electronic control 166 will have, in the electronic memory thereof, data in the form of an electronic table which will indicate, for the given angle $A_L$, the necessary angle $A_R$ of the right steering knuckle 40 to provide a toe angle which produces correct Ackerman steering. This calculated steer angle relationship will be correct for the particular steering geometry of the vehicle, including the vehicle wheel base, vehicle track, axle weight, and vehicle speed. Typically, a table specific to the vehicle configuration on which the electronic control 166 is mounted will be programmed into the control at vehicle assembly. Alternatively, the electronic control 166 can store a plurality of electronic tables corresponding to different vehicle configurations and a specific table used by manufacturer or user selection. The electronic control 166 can also be configured so that a driver can select the proper electronic table based on certain vehicle conditions. The electronic control 166 then actuates the valve 146 to either supply hydraulic fluid under pressure to the chamber 180 or drain hydraulic fluid from the chamber 180 to lengthen or shorten the tie rod assembly 32, as appropriate, until the steer angle $A_R$ of the right steering knuckle 40 measured by angle sensor 162 is at the optimum Ackerman angle setting as determined from the appropriate electronic table. The operation of the system will be continuous to constantly provide the toe angle necessary for correct Ackerman steering at all phases of vehicle steering. While it is preferred to have tables stored in the electronic control system 166, typically a type of microprocessor, it may also be possible to provide in the electronic control system 166 the calculation of the various equations which would be necessary to calculate the necessary angle of right steering knuckle 40 based on the input angle of the left steering knuckle 38 in a real time calculation. If a microprocessor utilized in electronic control system 166 has sufficient speed and memory for storing floating point arithmetic routines, and is capable of handling the many iterations of the series approximations of trigonometric calculations that would be necessary for a real time calculation of the angle for the right steering knuckle 40, this technique can replace the use of stored tables.

Figure 6:
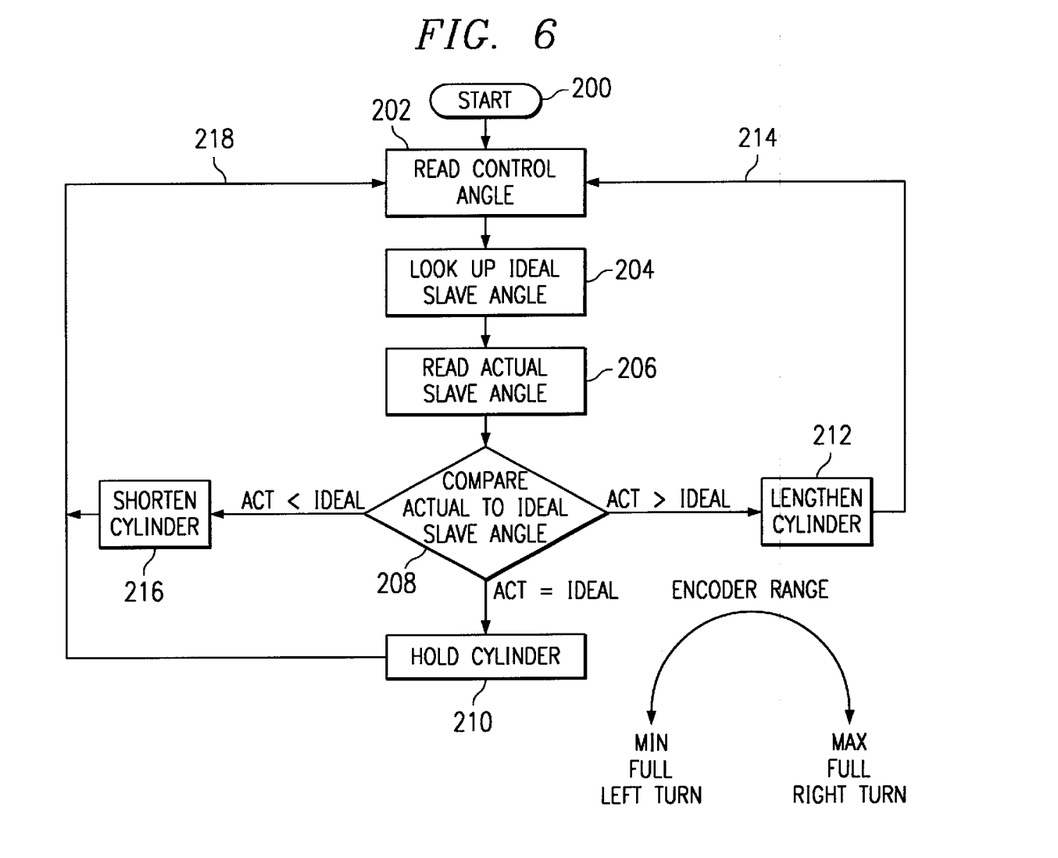
FIG. 6 is a logic flow chart for the control system of the present invention.

FIG. 6 illustrates the flow chart control logic of the electronic control 166. The operation will start, as represented by box 200, when the vehicle begins operation. The first step will be the reading of the left wheel angle sensor 160 to determine the angle of the left steering knuckle 38, represented by box 202. The electronic control 166 will then electronically look up the ideal angle of the right steering knuckle 40 in the memory of the electronic control 166 as represented by box 204. The electronic control 166 will then read the actual right steering knuckle 40 angle from angle sensor 162, as indicated by block 206. The electronic control 166 compares the measured angle of the right steering knuckle 40 to the ideal angle from the electronic table in block 208. If the angles are identical, or within a predetermined acceptable range of difference, there is no need to change the angle of the right steering knuckle 40 or change the length of the tie rod assembly, so the hydraulic linear actuator cylinder is held, as indicated by block 210. On the other hand, should the measured angle of the right steering knuckle 40 exceed the ideal value desired for the right steering knuckle 40, the electronic control 166 will cause the tie rod assembly to lengthen, as indicated in block 212. A closed loop system, as illustrated by lines 214 will continue the lengthening of the cylinder until the measured angle of the right steering knuckle 40 is the same as the ideal angle. If the measured angle of the right steering knuckle 40 is less than the ideal angle, the electronic control 166 will cause the tie rod assembly to be shortened, as indicated by a block 216. Again, a feedback loop, indicated by line 218, is used so that the cylinder continues to be shortened until the measured angle of the right steering knuckle 40 equals the ideal angle.

Certain advantages are provided by the embodiment of the present invention, including a fail-safe provision. Should the hydraulic circuitry fail, the force of the spring 120 will drive the piston 118 into solid engagement with the end wall 128 of the chamber 180, shortening the length of the tie rod assembly to the shortest possible configuration. Of course, the design of tie rod assembly 32 can be varied so that the spring acts to lengthen the tie rod assembly to the longest possible configuration, if desired. While this will not provide correct Ackerman steering at all turn angles, the vehicle can nonetheless be safely steered until a repair is affected. Also, the use of a hydraulic accumulator 144 permits the size of the hydraulic pump 142 to be minimized as the sudden transients required by sudden steering movements can be accommodated by the reservoir of hydraulic fluid in the accumulator. The pump need only be sized to provide sufficient pressurized fluid for the average demand of the system. Therefore, the pump will typically run only intermittently, reducing energy demands and wear.

The adjustment for initial toe angle can be automatically made by the system of the present invention. Thus, while the present invention is primarily contemplated to provide steer angles for correct Ackerman steering, the invention can also include the use of an automatically adjustable length tie rod assembly to eliminate conventional manual tie rod length adjustments. It is possible to eliminate the conventional adjustable tie rod ends 160, as seen in FIGS. 3 and 4 completely, if desired. Setting of the initial toe angle can be done completely by adjusting the length of the tie rod assembly with the hydraulic linear actuator. Further, the present invention can provide for maximum clearance at the tie rod ends by eliminating the components previously required to adjust toe-in manually.

In yet another alternative of the present invention, the device can be used to eliminate the need for mechanical readjustment of tie rod length. The electronic control 166 can adjust the tie rod length as desired in a conventional vehicle to achieve and maintain a proper toe in angle and thereafter cause it to remain fixed, foregoing any Ackerman angle adjustment, even if the tie rod assembly is forced or driven out of adjustment. For example, the toe in could be properly set at the factory during manufacture, typically by adjusting one or more mechanical tie rod adjustments. The electronic control 166 can then be activated and used to maintain that same toe in angle by monitoring the Ackerman angles encountered during service. If a vehicle were to run over debris, causing a tie rod to be bent, the electronic control 166 would reestablish the proper toe in angle, within the range of motion permitted by the control. The system thus automatically readjusts the length of the tie rod dimensions to maintain the set toe in angle. It would be even possible to use the electronic control 166 at the factory to adjust the tie rod dimensions to set the initial toe in angle and then have the electronic control 166 thereafter maintain that desired toe in angle. This potentially could eliminate the need for conventional tie rod adjustment ends altogether.

In a modification of the present invention, hydraulic fluid under pressure can be provided to both chambers 180 and 182. A modified control valve 146 would be used which has fluid lines 152 and 188 (shown in dotted line in FIG. 4) to chambers 180 and 182, respectively. In such a device, the piston can be moved within the cylinder by simply transferring hydraulic fluid under suitable pressure from one chamber to another. Preferably, the spring 120 is provided, as before, in the chamber 182. Thus, the fail-safe operation of the modified version will be identical to the version described previously.

Although a single embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

What is claimed is:

1. A steering system for use in a vehicle having a first steerable wheel member mounted to the vehicle for pivotal motion about a first axis and a second steerable wheel member mounted to the vehicle for pivotal motion about a second axis, said steering system comprising:

a tie rod assembly adapted to be mounted between the first and second steerable wheel members to link the first and second steerable wheel members for joint pivotal motion, said tie rod assembly having a length, the length determining the angular relationship of the second steerable wheel member about the second axis dependent upon the angular relationship of the first steerable wheel member about the first axis, said tie rod assembly including structure for adjusting the length of said tie rod assembly;

a first angle sensor for sensing an angle of the first steerable wheel member about the first axis relative to a reference angle;

a second angle sensor for sensing an angle of the second steerable wheel member about the second axis relative to a reference angle; and a controller for determining a desired angle for the second steerable wheel member based on the sensed angle of the first steerable wheel member, wherein the desired angle allows for correct Ackerman steering, and wherein the controller is adapted to adjust the length of the tie rod assembly until the angle of the second steerable wheel member is measured to be the desired angle.

2. A steering system in accordance with claim 1 wherein the tie rod assembly includes a first tie rod portion and a second tie rod portion, said first and second tie rod portions forming a hydraulic cylinder assembly including a piston moveable within a chamber.

3. A steering system in accordance with claim 2 further comprising a hydraulic pump assembly including a hydraulic pump for providing hydraulic fluid under pressure to the chamber to vary the length of the tie rod assembly.

4. A steering system in accordance with claim 3 wherein the hydraulic pump assembly further includes an accumulator and a control valve, the control valve being in a first position for providing hydraulic fluid under pressure to the chamber to change the length of the tie rod assembly in a first direction and in a second position to permit removal of hydraulic fluid from the chamber to change the length of the tie rod assembly in the opposite direction, and in a third position for preventing hydraulic flow of fluid to and from the chamber.

5. A steering system in accordance with claim 4 wherein the hydraulic pump is electrically powered.

6. A steering system in accordance with claim 4 wherein the hydraulic pump is pneumatically powered.

7. A steering system in accordance with claim 4 wherein the hydraulic pump is mechanically powered.

8. A steering system for use in a vehicle having a first steerable wheel member mounted to the vehicle for pivotal motion about a first axis and a second steerable wheel member mounted to the vehicle for pivotal motion about a second axis, said steering system comprising:

a tie rod assembly adapted to be mounted between the first and second steerable wheel members to link the first and second steerable wheel members for joint pivotal motion, said tie rod assembly having a length, the length determining the angular relationship of the second steerable wheel member about the second axis dependent upon the angular relationship of the first steerable wheel member about the first axis, said tie rod assembly including structure for adjusting the length of said tie rod assembly;

a first angle sensor for sensing an angle of the first steerable wheel member about the first axis relative to a reference angle;

a second angle sensor for sensing an angle of the second steerable wheel member about the second axis relative to a reference angle; and a controller for adjusting the length of the tie rod assembly dependent upon the angles measured by the first angle sensor and the second angle sensor;

wherein the tie rod assembly includes a first tie rod portion and a second tie rod portion, said first and second tie rod portions forming a hydraulic cylinder assembly including a piston moveable within a chamber; and wherein the tie rod assembly further has a spring member mounted to urge the piston against a first end of the chamber.

9. A steering system for use in a vehicle having a first steerable wheel member mounted to the vehicle for pivotal motion about a first axis and a second steerable wheel member mounted to the vehicle for pivotal motion about a second axis, comprising:

a tie rod assembly adapted to be mounted between the first and second steerable wheel members to link the first and second steerable wheel members for joint pivotal motion, said tie rod assembly having a length, the length determining the angular relationship of the second steerable wheel member about the second axis dependent upon the angular relationship of the first steerable wheel member about the first axis, said tie rod assembly including structure for adjusting the length of said tie rod assembly;

a first angle sensor for sensing an angle of the first steerable wheel member about the first axis relative to a reference angle;

a second angle sensor for sensing an angle of the second steerable wheel member about the second axis relative to a reference angle; and a controller for adjusting the length of the tie rod assembly dependent upon the angles measured by the first angle sensor and the second angle sensor;

wherein the controller is adapted to adjust the length of the tie rod assembly dependent upon vehicle wheel base, vehicle track, axle weight and vehicle speed.

10. A method for maintaining a desired angular relationship between first and second steerable wheel members in a vehicle comprising the steps of:

measuring an angle of the first steerable wheel member mounted to the vehicle about a first axis relative to a reference angle;

determining a desired angle of the second steerable wheel member mounted to the vehicle about a second axis relative to the reference angle said desired angle based on the measured angle of the first steerable wheel member, wherein the desired angle allows for correct Ackerman steering; and adjusting the length of a tie rod assembly linking the first and second steerable wheel members while measuring an angle of the second steerable wheel member about the second axis until the angle of the second steerable wheel member about the second axis is measured to be the desired angle.

11. A method in accordance with claim 10 further comprising the steps of measuring the angles of the first and second steerable wheel members by optical encoders.

12. A method in accordance with claim 10 further comprising the step of maintaining a quantity of hydraulic fluid under pressure in an accumulator and selectively supplying the hydraulic fluid to or draining the hydraulic fluid from a hydraulic cylinder assembly in the tie rod assembly to adjust the length of the tie rod assembly.

13. A method in accordance with claim 10 further comprising the step of maintaining the tie rod assembly at a predetermined length upon failure of a device for adjusting the length of the tie rod assembly.

14. A method for maintaining a desired angular relationship between first and second steerable wheel members in a vehicle comprising the steps of:

measuring an angle of the first steerable wheel member mounted to the vehicle about a first axis relative to a reference angle;

determining a desired angle of the second steerable wheel member mounted to the vehicle about a second axis relative to the reference angle for the measured angle of the first steerable wheel member; and adjusting the length of a tie rod assembly linking the first and second steerable wheel members while measuring an angle of the second steerable wheel member about the second axis until the angle of the second steerable wheel member about the second axis is measured to be the desired angle;

wherein the step of adjusting the length of the tie rod assembly includes adjusting the length of the tie rod assembly dependent upon the vehicle wheel base, vehicle track, axle weight and vehicle speed.

* * * * *

UNITED STATES PATENT AND TRADEMARK OFFICE
CERTIFICATE OF CORRECTION

PATENT NO. : 6,283,483 B1
DATED : September 4, 2001
INVENTOR(S) : Stephen D. Johnson et al.

It is certified that error appears in the above-identified patent and that said Letters Patent is hereby corrected as shown below:

<u>Title page,</u>
Item [54], Title:, delete "ELECTRONICALLLY CONTROLLED ACKERMAN STEERING", and insert -- ELECTRONICALLY CONTROLLED ACKERMAN STEERING --.

Signed and Sealed this

Nineteenth Day of March, 2002

*Attest:*

JAMES E. ROGAN
*Director of the United States Patent and Trademark Office*

*Attesting Officer*